United States Patent [19]
Green

[11] Patent Number: 4,956,899
[45] Date of Patent: Sep. 18, 1990

[54] SELF CLAMPING DEVICE

[76] Inventor: John Green, 7 Avenue de Grande Bretagne, "Le Montaigne" Monte Carlo, Monaco

[21] Appl. No.: 339,504

[22] Filed: Apr. 17, 1989

[30] Foreign Application Priority Data

Mar. 22, 1989 [EP] European Pat. Off. ........ 89440023.3

[51] Int. Cl.$^5$ .............................................. B42F 1/00
[52] U.S. Cl. ..................................... 24/488; 24/67.5; 63/14.4; 63/14.7
[58] Field of Search .................. 24/67 R, 67.3, 67.1, 24/67.7, 67.9, 67.11, 488, 136 A, 706.8; 248/113; 211/66.89; 63/14.1, 14.4, 14.5, 14.7

[56]  References Cited
U.S. PATENT DOCUMENTS

| | | | |
|---|---|---|---|
| 331,088 | 11/1885 | Sacket | 24/488 X |
| 603,401 | 5/1898 | Forsheim | 24/488 X |
| 875,379 | 12/1907 | Rainess | 24/706.8 |
| 1,157,835 | 10/1915 | Beker et al. | 24/706.8 |
| 4,693,443 | 9/1987 | Drain | 24/488 X |

FOREIGN PATENT DOCUMENTS

28914 of 1905 United Kingdom ................. 24/488

Primary Examiner—James R. Brittain
Attorney, Agent, or Firm—Morgan & Finnegan

[57] ABSTRACT

Self-clamping device suitable for temporarily securing a material without damaging its surface with a force proportional to the material's weight and/or to any pulling force exerted on the material wherein the device includes a casing having an opening for said material, the casing being formed with two side walls diverging away from the opening, and at least one roller in the casing which is mounted rotatable and slidably along one of the walls and which positively urged towards the opening and the other wall so that when the material is inserted into the opening the roller is pushed away from the opening, any pulling force exerted upon the material thereby drawing the roller toward the opening so that as the roller moves along the diverging wall it moves toward the other wall so as to produce a wedging effect, and as a consequence thereof keeping the material pinched by the roller with a clamping force whose strength is in proportion to that of the pulling action.

14 Claims, 6 Drawing Sheets

SELF CLAMPING DEVICE

This invention relates to a new device adapted to secure, or to be secured to, products or materials generally— but not exclusively— in sheets, plates, slabs or the like, rigid or flexible, of any dimensions and of any nature. For convenience this description will refer to "flat products" but some examples will be given of further applications to non-flat products, to show the general character of the invention.

A number of devices of similar purposes are known, a typical one being the "clothes peg" type comprising two parts urged against one another by a spring. Such devices are largely used, not only for hanging clothes to a line but also as clips for keeping documents together or to fix a sheet to a table in a windy open space.

The common drawback of such devices is inherent to their construction: since said clip is active under the action of a spring, its pinching and holding effect is obviously constant. Now whereas such constant strength is satisfying in normal use, it can become insufficient under temporary conditions, where the force against the material being held becomes stronger than normal, e.g. a gale of wind: conversaly if a stronger spring is used to cope with such conditions, then it is too strong for normal use.

Moreover a clip of this kind is generally adapted for a relatively limited range of thickness of the material to be held. For greater thicknesses, the spring will be too distorted and will no longer exert its gripping effect. Moreover, once in use such a clip cannot accept an additional sheet without possibly causing the sheets already clamped to be released untimely and lost.

Finally such clamps are generally of limited dimensions with a corresponding limitation of their applications:

As an example, the handling of comparatively heavy and/or large plates such as building panels or concrete slabs, is currently only possible with hoisting units equipped with hooks which can damage the surface of such plates.

The purpose of the invention is to eliminate all those drawbacks, with a new device adapted to clamp or pinch material having any geometrical shape, including flat, round such as cylindrical, or even irregular such as the lobe of an human ear, with a force which will increase as the effort to remove the material is exerted by wrenching or pulling through wind, gravity or any other outside force. In the specific case of the handling of plate material, a device of the invention can equally handle large differences in the thickness of said material, one at a time or progressively, without releasing or loosening the plates already pinched.

In the particular case of handling of large and heavy plates such as prebuilt panels, concrete slabs or steel sheets or angle-bars of any section, the device of the invention can be adapted in dimensions, and possibly in shape to facilitate such handling without damaging the material by hooks or the same.

Moreover the device of the invention can be used for material of various shapes, not necessarily flat, for example for handling bottles. In addition the device can be adapted for securing jewellery, e.g. ear-rings to the ears.

To reach these targets as well as many others, the invention provides a clamping and self-blocking device adapted to be associated with a material for the purpose of temporarily securing one to the other without damaging their surface and with a strength proportional to their weight and/or to any pulling force exerted thereto, characterized in that it comprises a casing having an opening in its bottom for said material and formed with two side walls diverging upwards from said opening, and at least one roller in said casing mounted rotatively and slidably along one of said walls and positively urged downwardly towards said opening and the other wall, said roller when said flat material is inserted into said opening being pushed upwardly and away from said other wall, any pulling action exerted upon said material having for its effect to draw said roller downwardly and towards said other wall in the manner of a wedge effect, and as a consequence thereof to keep said material as strongly pressed against the roller with a pressure always superior to the pressure of the force working to remove the material from the device.

According to a first modification, the device comprises a unique roller, the blocking effect resulting from the pressure exerted by said roller against the opposite side wall of the casing. This modification is the simplest and the cheapest, and can be adapted to most applications.

According to a second modification, the device comprises two parallel rollers rotatively and slidably mounted in a casing having two slant walls converging towards an open bottom, said both rollers being normally positively urged towards said bottom, where they are close against each other, and being pushed away by any material inserted upwardly therebetween, any pulling action exerted upon said material will have the effect of drawing said rollers downwardly and against each other in the manner of a wedge effect, and as a consequence thereof, to keep said material firmly pressed between said rollers.

To release said clamping action, it is necessary and sufficient to pull said rollers(s) upwardly, which draws it (them) away by sliding it (them) along said slant wall(s).

It should be noted that devices somewhat similar have been proposed as clips for paper sheets, in offices or the like. However said devices comprised a roller urged downwardly by their own weight only, and without any member adapted to release its action. Therefore, on the one hand said action was limited in strength and in position, and consequently the application field of said devices was strictly limited to small and light materials such as paper sheet to be vertically clipped, e.g. against a wall; on the other hand, to extract said sheet, it was necessary to pull strongly thereupon, since it was by no means possible to move the roller upwardly to release its action.

To avoid such limitations and drawback, according to an important feature of the invention, the rollers can be urged downwardly by an elastic organ, such as a spring, e.g. a compression spring wound around a wire bearing the roller at one end and being equipped at the other end with a part to be pulled upward in order to release the roller. In case of two rollers, they are mounted at the ends of the two branches of a fork around which are wound two compression springs, said branches urging at the same time the rollers towards the slant walls of the casing and the top of the fork being in the form of a ring to be pulled upward to release the clamping action of the rollers.

As already mentioned, the application area of the invention is extremely broad:

As an example, the device can be used in the usual way as a clothes peg without risking the possibility of the clothes being wrenched away by a gale of wind;

As another example it can be used for clamping documents together, with the advantage of making it possible to add further documents to an existing bundle without disturbing the same;

As another example, it can be dimensioned so that it is possible to handle large and heavy plates or the same, such as concrete slabs, building panels and the like.

As another example it can be used as one-way brake system in apparatuses involving the one way passage of a tape between magnetic head, such as tape-recorders as magnetoscopes, or else the use of pulling cables such as towing cars or boats, in place of the usuals hooks;

As another example it can be used as a thief-proof display device for books, records, paintings and the like, when the release element is not accessible to the public;

As another example, directed to the handling of non-flat materials, it makes it possible to clamp between the rollers one or several vertical cylindrical materials such as the necks of bottles in order to pack them into a container or a set of test-tubes in laboratories.

As a further example of use with non flat materials, it can be used as a device for securing jewellery, such as an ear ring to the lobe of a ear, without injury or pain on the ear and without risking losing the earring.

It should be understood that one important advantage of the device of the invention, is that the clamping force is a result of two separate actions, the first is the pressure of the spring(s) which positively urges the rollers downwardly against the slanted side walls, the second is a force which urges the roller downwardly as a result of any pulling action on the material which is being clamped.

The device of the invention can therefore be used in any position, vertically, upside down, diagonally or horizontally for example when used in a towing system for cars or boats, then it is horizontal and functions as well. The invention will now be decribed more in detail, with reference to the drawing on which:

FIG. 6 is a section similar to FIG. 2 of a one-roller modification of the invention adapted to secure an earring. Referring first to FIGS. 1 to 4, the device comprises a couple of parallel rollers 1 and 2 lodged in a casing 3 having two side walls 4 and 5, slanting and converging downwardly to an opening 6. The casing is closed by front and rear walls 7 and 8 and by a cover 9, from which project walls 7' and 8' for adapting the device to any proper support.

Figure 1:
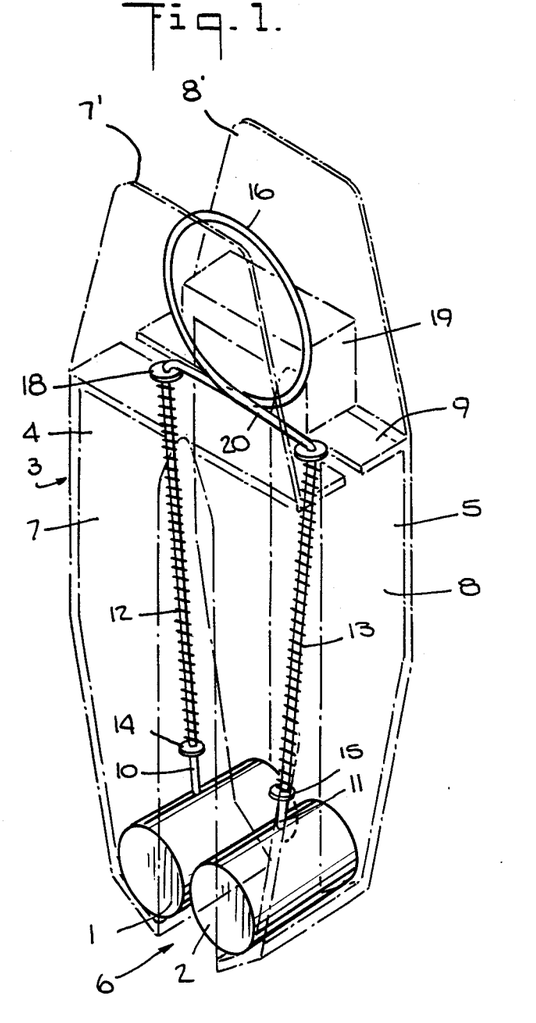
FIG. 1 shows in perspective a two-roller modification of the device of the invention, the casing being shown as being "transparent"
Figure 2:
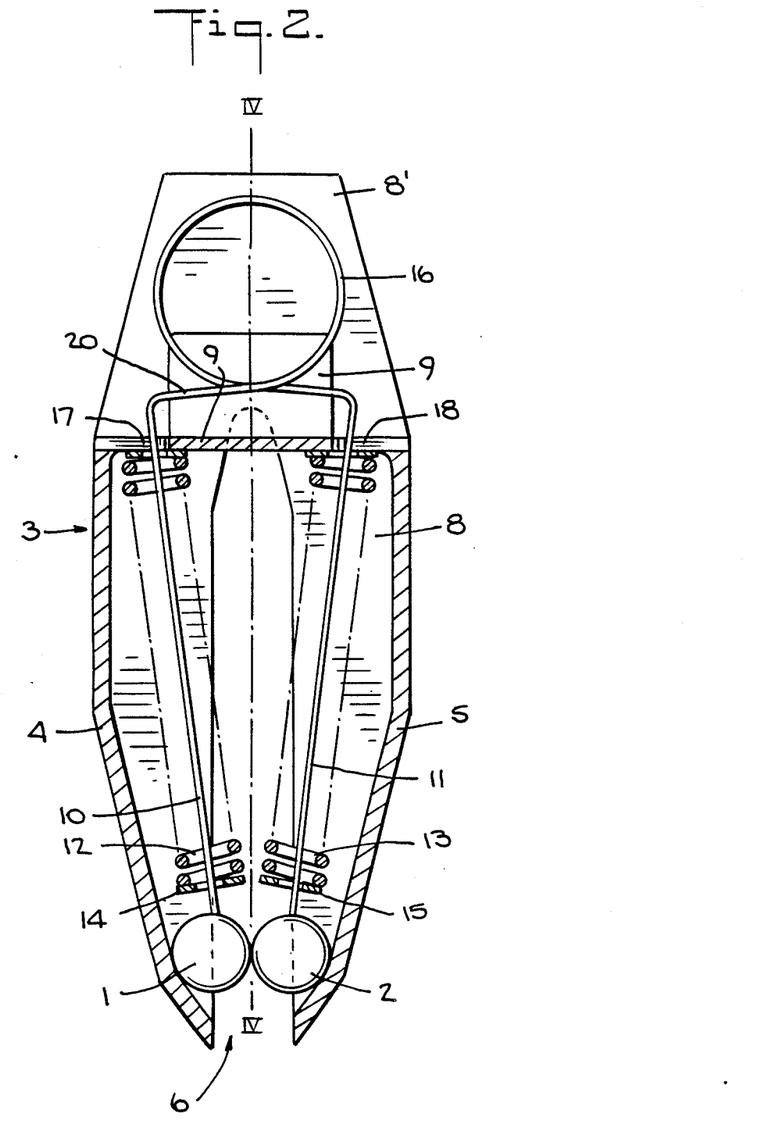
FIG. 2 is a vertical section through the median plane of the device.
Figure 3:
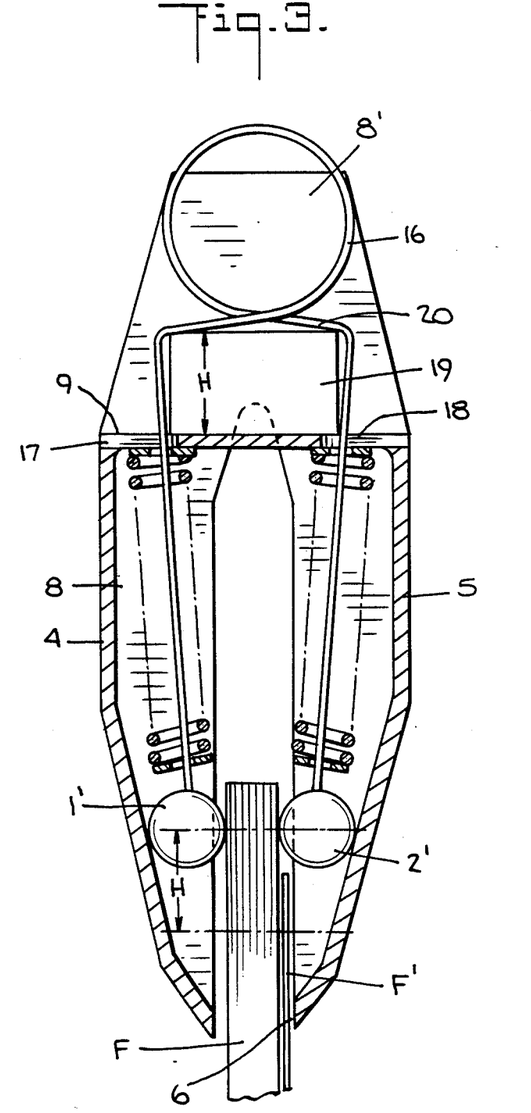
FIG. 3 is a vertical section through plane IV—IV of FIG. 2

Each roller 1, 2 is mounted at one end of the branches 10 and 11 of a wire fork, said branches being normally divergent and being elastically urged towards each other by the engagement of the rollers 1, 2 against the walls 4, 5. Around each branch 10, 11 is wound a compression spring 12, 13 abutting at one end against bearing 14, 15 of the corresponding branch 10, 11 and at the other end against a bearing below the lower face of cover 9. The resiliency of fork 10, 11 is completed by a ring 16, between walls 7', 8' above cover 9, having various functions discussed hereunder, the branches 10, 11 passing through openings 17, 18 of said cover 9.

Figure 4:
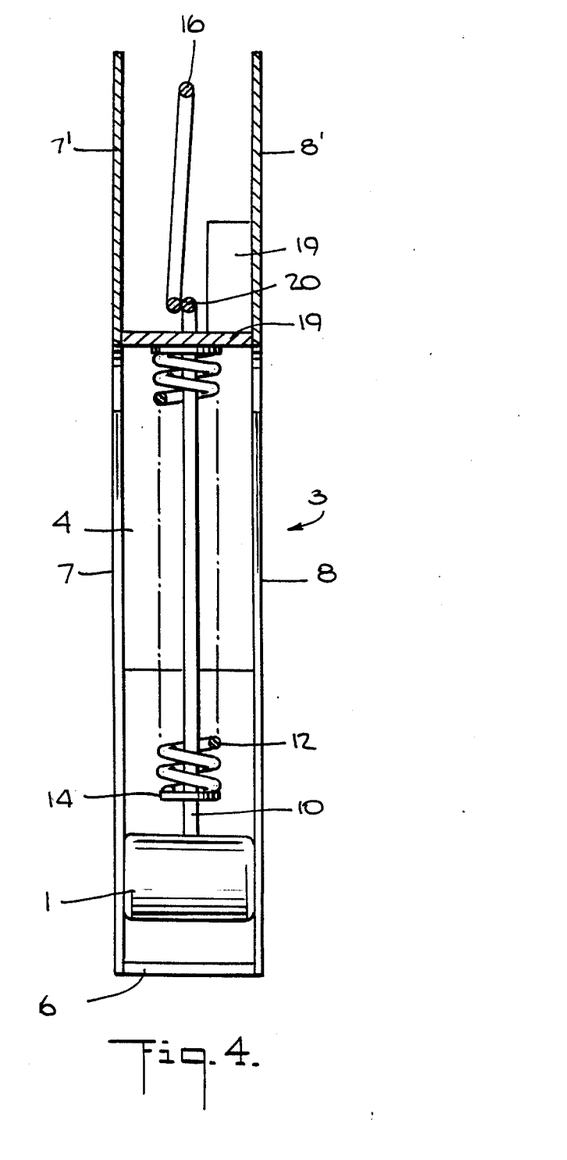
FIG. 4 is similar to FIG. 2, a sheet material being clamped in the device.

The use of the device is as follows:

When a sheet material F is inserted through opening 6, said material F pushes the rollers 1, 2 upwardly until they are sufficiently spaced as in 1', 2' (FIG. 4).

The entire assembly rollers 1, 2/fork 10, 11/springs 12, 13/ring 16 is therefore pushed upwardly against the upper bearings 12, 13, while both branches 10, 11 constantly urge the rollers 1, 2 against the walls 4, 5, so that the rollers are moved aside, leaving a space for the material F.

If and when any pulling action is exerted upon said sheet material F, the same assembly is also pulled downwardly. Under these circumstances, the rollers 1, 2 are rolled downwardly resulting in them being forced against material F and side walls 4, 5 in a wedge effect, so that they clamp the material F with a greater strength proportionate to the force opposed to pull material F away from the device.

The device exerts therefore upon the material F a clamping action proportional to the pulling or wrenching action exerted upon the same material F. This gripping force has positively no limit except the strength of material of the device.

If a supplemental sheet F' has to be added to an already clamped sheet F, insofar as the opening 6 is broad enough this sheet F' can be inserted between the rollers 1', 2', in the same manner without disturbing the bundle F.

To release the material F, only the ring 16 needs to be pulled. The said assembly is lifted as a whole and under the spreading out action of the branches 10, 11, the rollers 1', 2', rolling upwardly on the walls 4, 5, separated, which releases the clamping or pinching effect.

To facilitate the insertion of the sheet F into the device, by keeping the rollers 1, 2 separated during said insertion, the ring 16 may be used to bring the horizontal branch 20 of fork 10, 11 to rest upon a spacer 19 of a thickness H of the same value as the vertical distance between the two positions 1, 2 and 1', 2'. When the branch 20 is hooked onto the spacer 19, the above assembly cannot fall back and the rollers 1, 2 remain apart during the insertion of the sheet F. By releasing the fork assembly 10, 11, 20 and allowing it to fall clear of spacer 19, the action of springs 12, 13, will force the assembly and rollers sheet F until sheet F is wedged between the rollers 1', 2' and side walls 4', 5'.

Figure 5:
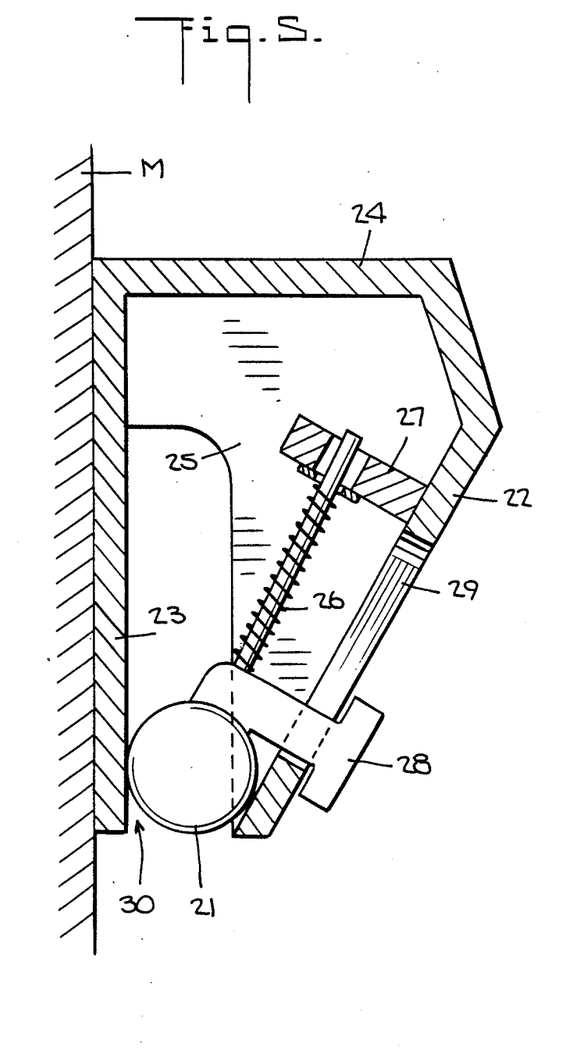
FIG. 5 is a section similar to FIG. 2 of a one-roller modification of the invention.

Turning now to FIG. 5, it shows a similar device comprising only one roller 21.

Said roller 21 rotatively and slidably mounted along a slant said wall 22 of a casing closed by a vertical side wall 23, a cover 24 and front and rear walls 25. The roller 21 is urged downwardly by a spring 26 compressed between a lug 27 of the casing and a pin 28 attached to the roller 21 and movable from the exterior along an elongated slot 29 of the wall 22.

In the same manner as in the previous device, any material introduced through the opening 30 of the casing pushes the roller 21 upwardly against the spring 26, then any pulling action upon said material will have the effect of urging the roller 21 downwardly along the wall 23, which will block said material against said wall.

For example said wall 23 can be attached to a wall M of a room, the device being using to hang towels. To release a towel only the pin 28 needs to be pushed upwards.

Figure 6:
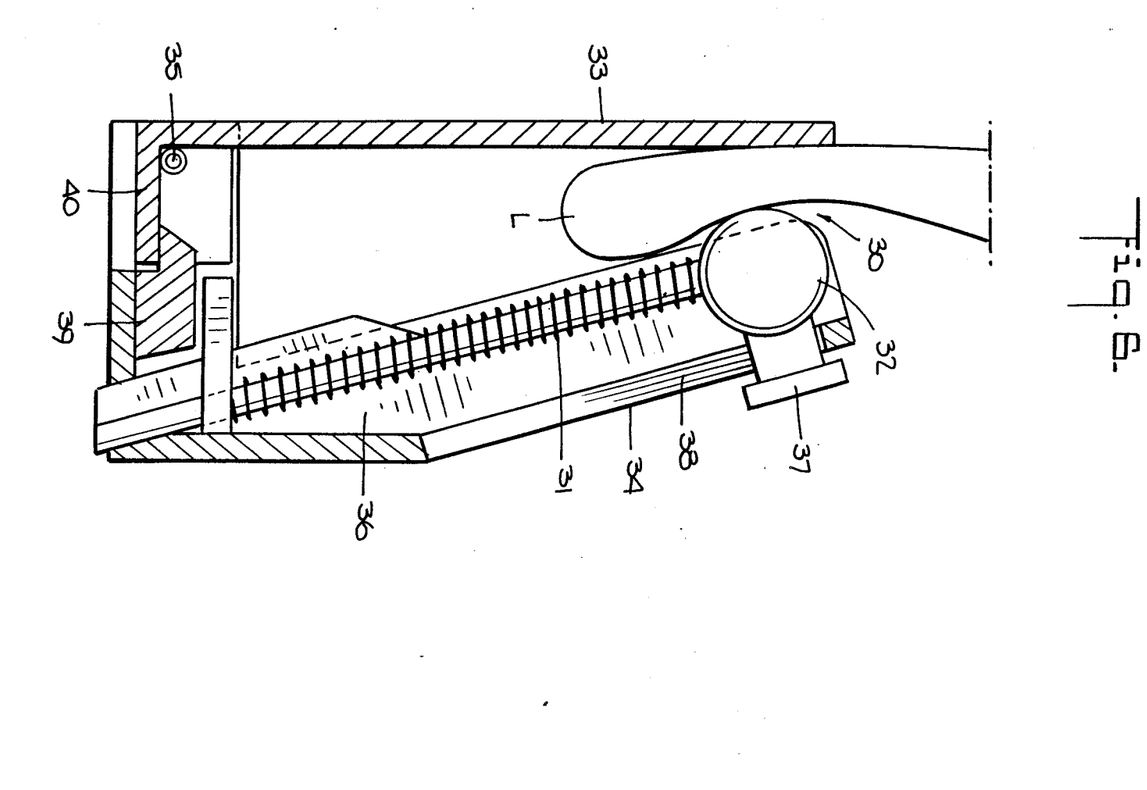

In the application of FIG. 6, the device is used with its opening 30 upwards, which is possible thanks to the spring 30 urging the roller 31 upwards and towards the vertical wall 33 along the slant wall 34.

This device includes an additional feature when it is adapted to be used as an ear ring securing device: Since the lobe L of the ear comprises generally a cushion thicker than the opening 30 means are provided to allow a temporary opening of the casing for its positioning upon the ear. In the illustrated case, a half-casing 36 can pivot around an axis 35 with respect to the plate 33. By pushing the pin 37 through an elongated slot 38 of the wall 34, the roller 32 is pushed back and together a latch 39 engaging a rim 40 of the wall 33 i unlocked. Then the casing can be opened and placed in position around the lobe L. By closing the half-casing 36 on the plate 33, the latch is automatically locked and the casing can no longer open. The roller 32 acts then upon the lobe L in the same manner as in the previously illustrated examples, by pressing it against the wall 33, without hurting it, but preventing any possibility of losing the ear-ring.

Many and various further modifications and additional features can be realized based upon the same basic concept.

According to the application, the device can be made of moulded plastic material or in other materials such as metals or the same. The rollers or vertical walls can advantageously be made rough, milled or smooth. The dimensions of the device are obviously adapted to the materials to be handled, including the dimension of the opening between the side walls said opening can be modified variably by the user.

I claim:

1. A self-clamping device for temporarily securing a relatively flat piece of material without damaging said material, comprising:
   a casing having a longitudinal opening lying in a first plane through which opening said relatively flat piece of material can pass, said casing being formed with a relatively flat interior side wall of a given width diverging away from a second plane, said second plane lying perpendicularly to said first plane, and a relatively flat interior opposing wall of about said same given width as said diverging wall, said opposing wall facing said diverging wall;
   a first and second parallel roller each of said given width and each rotatably and slidably mounted in said casing, said casing having two flat interior side walls each diverging away from said second plane, said rollers being dimensioned and disposed so as to contact substantially all of said material as is covered by said device;
   first and second rods;
   first and second compression springs wound about and engaging said first and second rods;
   first and second means for attaching said first and second rods to said first and second rollers; and
   means for releasing said material;
   said rollers, diverging side walls and springs all cooperating so that when said material is inserted into said opening said material passes between said rollers and said rollers roll along said diverging walls away from said opening, compressing said springs, whereby after said material is inserted in said casing said springs force said rollers along said diverging walls toward said opening and said material so that said rollers are urged against said material by the wedging action of said rollers as they contact said diverging walls, and furthermore, if any pulling force is applied in an attempt to pull said material from said casing said rollers are even more securely drawn toward said opening by said force, thereby even more firmly wedging said rollers against said material with a wedging action proportional to said pulling force.

2. A self-clamping device as in claim 1 wherein said means for releasing further comprises:
   a ring shaped grasping formation joining said first and second rods, said grasping formation acting as a torsional spring, said rods and said ring being disposed within said casing so that said rods have a preferred position whereby said rods, when constrained within said casing, are pressed outwardly against said diverging walls by said torsional spring so that to release said material said ring is pulled away from said opening, pulling said rollers away from said opening, whereby said rollers attempt to achieve said preferred position and move away from said material, releasing said material.

3. A self-clamping device as in claim 1, further comprising:
   a spacer block provided upon said casing,
   said spacer block being dimensioned and disposed so that when said ring is pulled away from said opening to a release position said ring can engage said spacer block, thereby maintaining said ring in said release position and said rollers away from said material.

4. A self-clamping device for temporarily securing a relatively flat piece of material without damaging said material, comprising:
   a casing having a longitudinal opening lying in a first plane through which opening said relatively flat piece of material can pass, said casing being formed with a relatively flat interior side wall of a given width diverging away from a second plane, said second plane lying perpendicularly to said first plane, said diverging wall having a groove disposed approximately perpendicular to said opening, and a relatively flat interior opposing wall of about said same given width as said diverging wall, said opposing wall facing said diverging wall;
   a single roller of about said same given width as said diverging and opposing walls, said roller being dimensioned and disposed so as to contact substantially all of said material as is covered by said device;
   an internal lug rigidly attached to said diverging wall;
   a rod, said rod being disosed within said casing so as to lie approximately parallel to and approximately overlap said groove, said rod having ends proximal and distal to said opening, said distal end slidably engaging said lug so that said rod can move along a line parallel to said diverging wall;
   a slider pin movably engaging said groove, said roller being rotatably attached to said slider pin, said slider pin being rigidly attached to said proximal end of said rod; and,
   a compression spring having proximal and distal ends, said compression spring surrounding said rod, said proximal end of said spring abutting said slider pin, said distal end of said spring being joined to a stop washer so that when said slider pin is moved away from said opening said spring is compressed between said slider pin and said lug;

said roller, diverging side wall and spring all cooperating so that when said material is inserted into said opening said roller is forced along said diverging wall away from said opening, compressing said spring, whereby after said material is inserted in said casing said spring urges said roller along said diverging wall toward said opening and said material so that said roller is urged against said material by the wedging action of said roller as it contacts said diverging wall, and furthermore, when any pulling force is applied in an attempt to pull said material from said casing said force draws said roller even more securely toward said opening, thereby even more firmly wedging said roller against said material with a wedging action proportional to said pulling force.

5. A self-clamping device as in claim 4 wherein said casing is built in at least two parts which can be opened and closed, and further comprising a latch to hold said parts closed.

6. A device according to claim 4, wherein said casing is built in two parts adapted to temporarily open and further comprising a latch to lock said parts in closed position.

7. A ear-ring comprising a clamping device according to claim 6.

8. A peg and more specifically a towel hanger, comprising a clamping device according to claim 4.

9. A self-clamping device adapted to be associated with a material of any shape for the purpose of temporarily securing said device to said material without damaging their surfaces and with a clamping action proportional to their weight and/or to any pulling force exerted thereto, in which a rolling cylinder pinches said material against a wall with a wedge effect, comprising:

a casing having a lower opening and first and second lateral walls diverging upwardly away from said lower opening, at least one pressing cylinder which rolls along said first wall, said pressing cylinder being urged downwardly by a first elastic element and being urged towards said first wall by a second elastic element, whereby the insertion of said material into said device upwardly from said lower opening pushes said pressing cylinder upwardly against said first elastic element and at the same time towards said first wall against said second elastic element, whereby any downward force exerted upon said material urges said pressing cylinder downwardly and towards said second wall, exerting therefore upon said material said clamping action between said cylinder and said second wall, by said wedge effect that is as strong as said downward action is strong.

10. A device according to claim 9, wherein said second elastic element is a guiding rod, said pressing cylinder being attached to said guided rod, and said first elastic element being a compression spring wound around said guiding rod.

11. A device according to claim 9 further comprising means for exerting an upward pulling action upon said cylinder, so that said cylinder is brought away from said first wall and said clamping action is released.

12. A device according to claim 11, wherein said casing walls have a diverging angle, and comprising:

two pressing cylinders, wherein said second elastic element further is a forked elastic member having two ends, said two pressing cylinders being attached to said two fork ends, and said fork has a diverging angle larger than the diverging angle of said lateral casing walls.

13. A device according to claim 12, further comprising an element attached to said fork which can be pulled upwardly to an upper position so that said cylinders rolling along said lateral walls move upward and release said clamping action.

14. A device according to claim 13, further comprising a spacer which can be positioned to keep said pulling element in said upper position so that said cylinders are held upward and said clamping action released.

* * * * *